US010112280B2

United States Patent
Mappes (10) Patent No.: US 10,112,280 B2
(45) Date of Patent: Oct. 30, 2018

(54) METHOD FOR MACHINING OPTICAL WORKPIECES, IN PARTICULAR, PLASTIC SPECTACLE LENSES

(71) Applicant: Satisloh AG, Baar (CH)

(72) Inventor: Thomas Mappes, Langgöns (DE)

(73) Assignee: Satisloh AG, Baar (CH)

( * ) Notice: Subject to any disclaimer, the term of this patent is extended or adjusted under 35 U.S.C. 154(b) by 346 days.

(21) Appl. No.: 15/223,339

(22) Filed: Jul. 29, 2016

(65) Prior Publication Data
US 2017/0028524 A1   Feb. 2, 2017

(30) Foreign Application Priority Data

Jul. 31, 2015  (DE) .................. 10 2015 009 973

(51) Int. Cl.
*B24B 13/00*   (2006.01)
*B24B 13/04*   (2006.01)
(Continued)

(52) U.S. Cl.
CPC ........ *B24B 13/0037* (2013.01); *B23B 27/005* (2013.01); *B23C 3/16* (2013.01);
(Continued)

(58) Field of Classification Search
CPC . B24B 13/0037; B24B 13/0031; B24B 13/04; B24B 13/06; B24B 13/005; B24B 1/00; B23C 3/34; B23C 3/16
See application file for complete search history.

(56) References Cited

U.S. PATENT DOCUMENTS 4,170,092 A  * 10/1979  Keane, Jr. ............. B24B 13/005
                                                          451/43
6,712,671 B2   3/2004  Wallendof et al.
(Continued)

FOREIGN PATENT DOCUMENTS

DE   10 2007 007 161 A1   8/2008

OTHER PUBLICATIONS

DIN 58766—Blockstuck Durchmesser 43 mm fur Brillenglasfertigung, Mar. 1998, 2 pages.
(Continued)

*Primary Examiner* — Mathieu D Vargot
(74) *Attorney, Agent, or Firm* — Reising Ethington, P.C.

(57) ABSTRACT

A method of processing a workpiece with a first surface and a second surface facing away therefrom includes the following principal steps: (i) blocking the workpiece with the aid of a blocking material on a blocking member with the blocking material between blocking member and first surface, (ii) processing the workpiece by a geometrically defined cutting edge at the second surface for achieving the desired macrogeometry, (iii) processing the workpiece by a geometrically undefined cutting edge at the second surface for achieving the desired microgeometry and (iv) deblocking the workpiece from the blocking member. The principal step (ii) includes a plunge-cutting sub-step (ii.2) in which by a geometrically defined cutting edge an encircling plunge cut is produced which extends through the first surface as far as into the blocking material so that the workpiece with a predetermined edge profile remains on the blocking member radially within the plunge cut.

20 Claims, 6 Drawing Sheets

(51) Int. Cl.

| | | |
|---|---|---|
| *B24B 13/06* | (2006.01) | |
| *B24B 1/00* | (2006.01) | |
| *B23Q 39/00* | (2006.01) | |
| *B24B 13/005* | (2006.01) | |
| *B23C 3/34* | (2006.01) | |
| *B23C 3/16* | (2006.01) | |
| *B23B 27/00* | (2006.01) | |
| *B23P 23/00* | (2006.01) | |

(52) U.S. Cl.
CPC ................ *B23C 3/34* (2013.01); *B23P 23/00* (2013.01); *B23Q 39/00* (2013.01); *B24B 1/00* (2013.01); *B24B 13/005* (2013.01); *B24B 13/0031* (2013.01); *B24B 13/04* (2013.01); *B24B 13/06* (2013.01); *B23B 2215/40* (2013.01); *B23B 2226/61* (2013.01); *B23C 2215/40* (2013.01); *B23C 2226/61* (2013.01)

(56) References Cited

U.S. PATENT DOCUMENTS

| | | | |
|---|---|---|---|
| 7,066,794 | B2 | 6/2006 | Granziera et al. |
| 7,066,797 | B2 | 6/2006 | Volken et al. |
| 7,278,908 | B2 | 10/2007 | Urban et al. |
| 7,597,033 | B2 | 10/2009 | Savoie et al. |
| 7,975,356 | B2 | 7/2011 | Schafer et al. |
| 8,382,932 | B2 | 2/2013 | Savoie |
| 8,628,071 | B2 | 1/2014 | Fiedler et al. |
| 8,905,388 | B2 | 12/2014 | Breme et al. |
| 8,931,769 | B2 | 1/2015 | Pavel et al. |
| 9,089,948 | B2 | 7/2015 | Schafer et al. |
| 9,120,196 | B2 | 9/2015 | Geurts et al. |
| 2013/0095733 | A1 | 4/2013 | Lemaire et al. |

OTHER PUBLICATIONS

European Search Report for No. EP16001634.1 dated Mar. 30, 2017, 7 pages.

* cited by examiner

METHOD FOR MACHINING OPTICAL WORKPIECES, IN PARTICULAR, PLASTIC SPECTACLE LENSES

TECHNICAL FIELD

The present invention relates in general to a method for machining optical workpieces. In particular, the invention relates to a method for machining spectacle lenses of plastic, for example polycarbonate, CR39 or so-called high index materials, such as carried out in RX workshops, i.e. mass production facilities for making individual spectacle lenses according to prescription.

PRIOR ART

The following process steps are usually carried out in RX workshops in accordance with, for example, document EP 1 593 458 A2, which is incorporated herein by reference. Initially a suitable right hand and/or left hand spectacle lens blank is removed from a semi-finished product store: semi-finished products insofar as the spectacle lens blanks, which are usually round or oval as seen in plan view and are still not edged, have already been processed to finished state at one of their respective two optically effective surfaces. The spectacle lens blanks are then prepared for the blocking process, namely by applying a suitable protective film or a suitable protective lacquer for protection of the already finished optically effective surface.

The so-called blocking of the spectacle lens blanks takes place next. In that case the spectacle lens blank is connected with a suitable blocking member, for example a blocking member according to German Standard DIN 58766. For that purpose, the blocking member is initially brought into a predetermined position relative to the protected, already finished surface of the spectacle lens blank and in this position the space between the blocking member and spectacle lens blank is then filled with a molten material (e.g. a metallic alloy which is usually bismuth-based, or wax). After hardening of the filling material the blocking member represents a mount for processing the spectacle lens blank, and subsequently has to reliably remain mounted to the spectacle lens during several processing procedures. As an alternative to the aforesaid hardenable blocking materials it has already been proposed (DE 10 2007 007 161 A1, and EP 2 011 604 A1, which are incorporated herein by reference) to use a special hardenable adhesive (optionally activated under ultraviolet light) in order to connect the blocking member to the spectacle lens blank, the adhesive being present as a layer therebetween.

Only then can the spectacle lens blanks be prepared by machining depending on the respective material. In the case of plastic material, a geometrically defined cutting edge, i.e. regular milling and/or turning is used in a processing machine (see with respect thereto, for example, documents EP 1 719 585 A2 and EP 2 011 603 A1, which are incorporated herein by reference). In that case, the optically effective surface, which was still not processed beforehand, of the respective spectacle lens blank receives its macrogeometry, i.e. its optically active form in accordance with the prescription.

The fine processing of the spectacle lenses then takes place by machining, and specifically by a geometrically undefined cutting edge, in which the prepared optically effective surface of the respective spectacle lens receives the desired microgeometry, i.e. surface quality. Depending on, inter alia, the material of the spectacle lenses the fine processing is divided into a fine grinding process and a subsequent polishing process (see with respect thereto, for example, documents EP 1 473 116 A1 and EP 1 698 432 A2, which are incorporated herein by reference) or if a surface capable of polishing was already generated during the preparation, the lens merely receives a polishing process in a polishing machine (see with respect thereto, for example, document EP 2 308 644 A2, which is incorporated herein by reference).

Only after the polishing process is the spectacle lens separated from the blocking member, i.e. deblocked before finally cleaning steps and optionally performable refining steps follow, for example anti-reflection coating or hardness coating of the spectacle lenses, and the edging, i.e. processing of the edge of the respective spectacle lens in correspondence with the shape of the spectacle frame in an edge processing device, e.g. edger. See with respect thereto, for example, document EP 1 243 380 A2, which is incorporated herein by reference.

In RX workshops spectacle lenses now have to be processed in all sizes, particularly even very small spectacle lenses. However, such spectacle lenses needed for very small spectacle frames of, for example, pure reading spectacles or children's spectacles always represent a challenge to RX workshops. The challenges begin even with the blocking, in which for very small spectacle lenses it is usually necessary to provide special blocking members or blocking rings with attachment rings. A milling tool with a small diameter then has to be used for milling very small spectacle lenses, which tool usually needs a tool change in the process.

Polishing of very small spectacle lenses also causes problems. In spectacle lens production polishing is usually performed by flexible, i.e. adaptable, tools (see with respect thereto, for example, document WO 2011/018212 A1, which is incorporated herein by reference). In the case of very small spectacle lenses there is the risk when polishing with these tools over the lens edge that an undesired shiny edge with adjoining matte surface regions arises at the spectacle lens; moreover, there is the risk that the lens edge digs into the polishing tool and damages the active processing surface thereof.

Against this background it is current practice in many RX workshops to separate out very small spectacle lenses prior to the polishing and then carry out processing with rigid shaping tools or old adaptable polishing tools near the end of their usefulness which then have to go to waste. However, this also causes additional steps and retooling work, which in mass production ultimately represents a tedious extra effort.

It would be desirable if even very small spectacle lenses could remain in the process for normal size, i.e. larger spectacle lenses and not need costly separate treatment.

What is desired is providing a simplest possible method for machining optical workpieces, particularly spectacle lenses of plastic, by which even comparatively small workpieces, for example spectacle lenses for children's spectacles, can be machined without problems.

SUMMARY OF THE INVENTION

In accordance with one aspect of the invention, a method is directed for processing an optical workpiece, particularly spectacle lens of plastic, which has a first surface and a second surface which faces away therefrom and is to be processed. The method includes the following principal steps carried in the indicated sequence: (i) blocking the workpiece with the aid of a blocking material on a blocking member as a holder during the processing so that the blocking material is located between the blocking member and the first surface of the workpiece; (ii) processing the workpiece by a geometrically defined cutting edge for achieving the desired macrogeometry at the second surface of the workpiece; (iii) processing the workpiece by a geometrically undefined cutting edge for achieving the desired microgeometry at the second surface of the workpiece; and (iv) deblocking the workpiece from the blocking member. The principal step (ii) of processing the workpiece by a geometrically defined cutting edge includes in accordance with one aspect of the invention (ii.2) a plunge-cutting sub-step in which by a geometrically defined cutting edge starting from the second surface an encircling plunge cut is produced which extends through the first surface and into the blocking material so that the workpiece with a predetermined edge contour remains on the blocking member radially within the plunge cut.

In other words, prior to the principal step (iii) of fine processing of the workpiece by a geometrically undefined cutting edge, i.e. the optional grinding process step and in all cases the polishing process step, the workpiece blank is divided by the encircling plunge cut into a radially inner element which later forms the workpiece, which is significantly smaller by comparison with the workpiece blank, and a radially outer annular element i.e. residual ring, which similarly remains on the blocking member and serves for tool support in the further processing. The radially inner, actual, small workpiece can then be further processed just like a large or normally sized workpiece, in which case the fine processing tools, which are employed, with geometrically undefined cutting edge can also be supported by the residual ring. After the processing, the residual ring and the workpiece are deblocked, the residual ring is discarded and the workpiece optionally is further processed.

In the case of processing spectacle lenses, it is thus not necessary to continue to provide special blocking members for small workpiece lenses or to provide different tools for processing small spectacle lenses or even to separate out small spectacle lenses from the standard processing sequence and treat them separately. The quality of the small spectacle lenses processed by the method according to the invention as a result does not differ from the good quality of larger spectacle lenses. Smooth edges, matte surface regions and other inaccuracies in the polished small spectacle lenses, such as repeatedly occurred in the prior art, are reliably avoided as a consequence of the edge support of the polishing tools by the residual ring, since this enables polishing as in the case of a large or normally sized spectacle lens. The edge support achieved by the residual ring also prevents, during the processing, tipping of the polishing tool off or away from the spectacle lens and thus jamming, which often accompanies in the prior art, between workpiece and tool. Moreover, by comparison with conventional procedure the flexible polishing tools are preserved and the service lives thereof extended. As such, additional steps of re-tooling work that was necessary in the prior art is reduced and processing is more efficient overall.

If the principal step (ii) of processing the workpiece by a geometrically defined cutting edge comprises as further sub-steps (ii.1) milling of the workpiece at the second surface by a milling tool for achieving the desired coarse macrogeometry and (ii.3) turning of the workpiece at the second surface by a turning tool for achieving the desired fine macrogeometry then the plunge-cutting sub-step (ii.2) can in principle be carried out before the milling sub-step (ii.1) or after the turning sub-step (ii.3). In the first case prior to milling, relatively lengthy plunge-cutting tools and processing times are needed in order to pass through the workpiece to the blocking material; in the second case after turning, particular care has to be used during production of the plunge cut not to damage the just turned-over second surface of the workpiece. Accordingly, a preferred method is where the plunge-cutting sub-step (ii.2) takes place between the milling sub-step (ii.1) and the turning sub-step (ii.3).

In a preferred first variant, a narrow turning chisel mounted to be secured against rotation can additionally be used for producing the plunge cut in the plunge-cutting sub-step (ii.2). This admittedly requires a rotary drive for the tool so as to produce the relative speed between workpiece and tool necessary for machining as well as a possibility of relative adjustment of the turning chisel with respect to the workpiece, which in the case of turning of the optically effective surfaces at spectacle lenses is present at the machine but otherwise at both. In an alternative second variant which is preferred just as much, use can be made of a rotationally driven end mill for producing the plunge cut in the plunge-cutting sub-step (ii.2). The machine kinematics of the processing device in this case obviously have to be designed so that starting from the second surface an encircling plunge cut in the workpiece can be produced, whether by suitable movement of the end mill and/or by suitable movement of the workpiece. Generators for surface processing of spectacle lenses such as described in, for example, documents EP 1 719 585 A2 and EP 2 011 603 A1, which are incorporated herein by reference necessarily provide motion along all movement axes required for producing the plunge cut.

In accordance with another aspect of the invention prior to the principal step (iii) of processing of the workpiece by a geometrically undefined cutting edge a transition region between the plunge cut and the second surface can be chamfered or rounded. It can, thus, be ensured in advantageous manner that a flexible polishing tool in the principal step (iii) of processing the workpiece by a geometrically undefined cutting edge is not subject to increased wear when moving over the encircling plunge cut. In that case, the transition region between the plunge cut and the second surface can be chamfered or radiused by the turning tool in the turning sub-step (ii.3) so that the chamfer or radiusing can advantageously be produced in one working step by one and the same tool without edges or with smooth transitions. Alternatively thereto the transition region between the plunge cut and the second surface can, however, also be chamfered or radiused by the end mill at the start and/or end of the plunge-cutting sub-step (ii.2), for which purpose the rotationally driven end mill during axial penetration into the second surface of the workpiece for producing the plunge cut or during axial retraction from the just-produced plunge cut also undergoes a radial advance with respect to the workpiece axis of rotation.

Finally, it is particularly advantageous if in the plunge-cutting sub-step (ii.2) an edge contour is produced at the workpiece which substantially corresponds with the external profile of a mount for the workpiece or the external profile of the mount for the workpiece. Thus, the plunge-cutting sub-step (ii.2) advantageously exercises with respect to the finally desired workpiece geometry, an actual shaping function in which either a finish-edging of the workpiece is already effected in the generator or a later finish-edging is connected with a smaller volume of removed material and less effort. In the case of a suitable geometry of the plunge-cutting tool in that regard even a roof facet or pointed facet can be generated at the edge of the workpiece, for example by an end mill, which is provided in its circumferential cutting edges with V-shaped grooves lying at a height and at the end of the plunge-cutting sub-step is radially inwardly adjusted without axial advance with respect to the workpiece and after appropriate resetting radially outwardly is axially withdrawn from the plunge cut again.

BRIEF DESCRIPTION OF THE DRAWINGS

The invention is explained in more detail in the following by way of preferred embodiments with reference to the accompanying partly schematic drawings, in which the same reference numerals characterize the same or corresponding parts and in which.

DETAILED DESCRIPTION OF THE EMBODIMENTS

Figure 1:
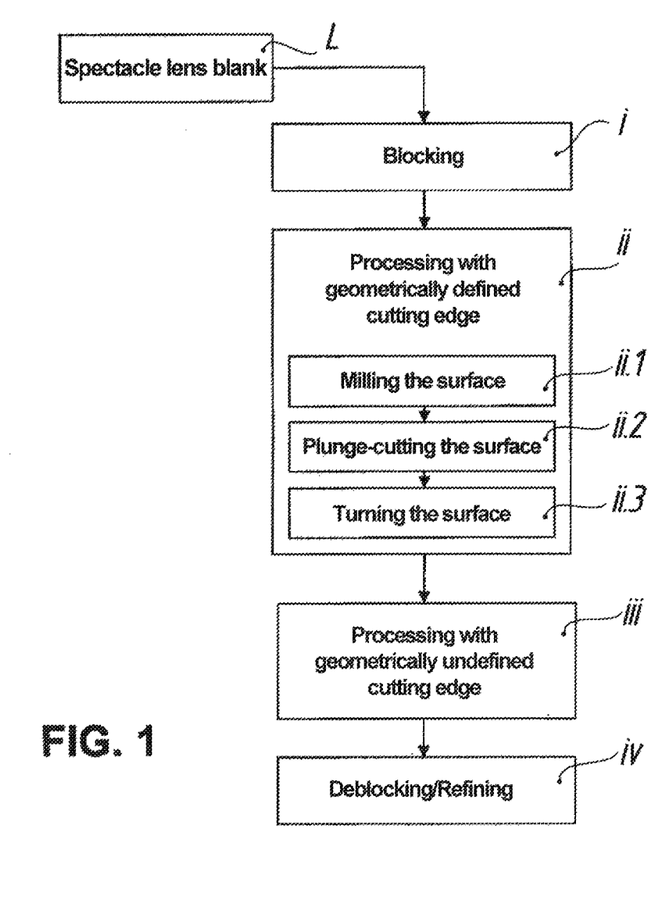
FIG. 1 shows a flow chart of a method of processing spectacle lenses of plastic, with the four principal steps of (i) blocking, (ii) preliminary processing, (iii) fine processing and (iv) deblocking/coating as well as the feature that the principal step of preliminary processing (ii) comprises a plunge-cutting sub-step (ii.2) for producing an encircling end-face plunge cut which separates the radially inner, actual spectacle lens from a radially outer residual ring of the spectacle lens blank.
Figure 2:
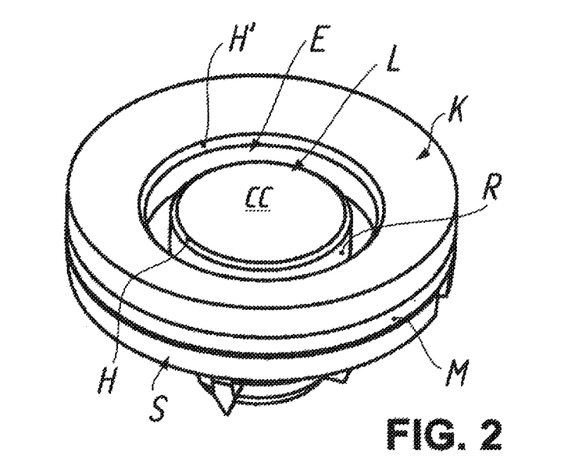
FIG. 2 shows a perspective view of an assembly of a spectacle lens blank blocked on a blocking member with the aid of a blocking material, after production of the encircling end-face plunge cut in the plunge-cutting sub-step (ii.2) of the method according to FIG. 1.
Figure 3:
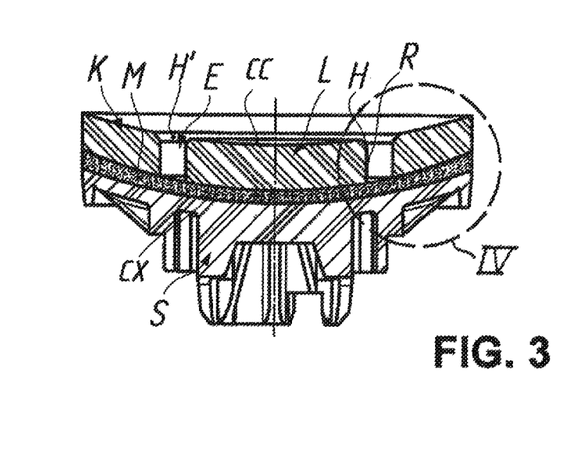
FIG. 3 shows a sectional view of the assembly shown in FIG. 2, illustrating the blocking member, blocking material and spectacle lens blank.

FIG. 1 shows a flowchart of a method for processing spectacle lenses L of plastic as optical workpieces, which according to FIGS. 2 and 3 have a first surface cx and a second surface cc facing away therefrom, of which the second surface cc is to be processed with respect to its optical characteristics in the course of the method. According to FIG. 1 the method comprises, in a manner known per se, the following principal steps carried out in the indicated sequence:

(i) blocking the spectacle lens L with the aid of a blocking material M, particularly a special, for example optically hardening, adhesive on a blocking member S as a handle for the processing, as described in detail in, for example, document WO 2009/106296 A1, which is incorporated herein by reference, so that the blocking material M is disposed between the blocking member S and the first surface cx of the spectacle lens L. The spectacle lens L is thus spaced from the blocking member by the thickness of the blocking material M as illustrated in FIGS. 2 and 3;

(ii) preliminary processing of the spectacle lens L by a geometrically defined cutting edge (for example milling and/or turning) for achieving the desired macrogeometry at the second surface cc of the spectacle lens L;

(iii) fine processing of the spectacle lens L by a geometrically undefined cutting edge for achieving the desired microgeometry at the second surface cc of the spectacle lens L by optionally grinding and in every case polishing; this processing step includes polishing and may be optionally preceded by grinding; and (iv) deblocking the spectacle lens L from the blocking member S, with optional refining steps following thereon after cleaning of the spectacle lens L; this optional refining steps include coating and edge-finishing for fitting of the spectacle lens L in a mount or a spectacles frame.

The principal step (ii) of the preliminary processing of the spectacle lens L by a geometrically defined cutting edge includes a plunge-cutting sub-step (ii.2) in which by a geometrically defined cutting edge starting from the second surface cc an encircling plunge cut E in the spectacle lens blank is produced, which cut extends through the first surface cx as far as into the blocking material M, as shown in FIGS. 2 to 5, so that the actual spectacle lens L with a predetermined edge profile R remains on the blocking member S radially within the plunge-cut E and is surrounded by a radially outer residual ring K of the spectacle lens blank. This residual ring K serves for, in particular, axial support of the tool or the tools in the fine processing step (iii), so that even very small spectacle lenses L can be processed with good quality similar to large or normally sized spectacle lenses without having to resort to special measures for example, retooling with special blocking members or blocking rings or with other rigid or older polishing tools for use in the blocking step (i) or in the fine processing step (iii). After the processing, the residual ring K in the deblocking step (iv) together with the spectacle lens L is deblocked by usual deblocking methods, for example by a high-pressure water jet as described in document WO 2011/042091 A1 or WO 2011/107227 A1, which are incorporated herein by reference, after which the residual ring K is discarded and the spectacle lens L can in a given case be further processed as known per se.

If the principal step (ii) of the preliminary processing of the spectacle lens L by a geometrically defined cutting edge in a manner known per se comprises the following further sub-steps: (ii.1) milling of the spectacle lens L at the second surface cc by a milling tool G (see FIG. 6) in order to achieve the desired coarse macrogeometry and (ii.3) turning the spectacle lens L at the second surface cc by a turning tool D (cf. again FIG. 6) in order to achieve the desired fine macrogeometry, then the plunge-cutting sub-step (ii.2) takes place, in the exemplifying method illustrated here, between the milling sub-step (ii.1) and the turning sub-step (ii.3), which on the one hand is an advantage with respect to short processing times and on the other hand eliminates the risk of damage to the macrogeometry of the second surface cc after the turning sub-step (ii.3).

Figure 6:
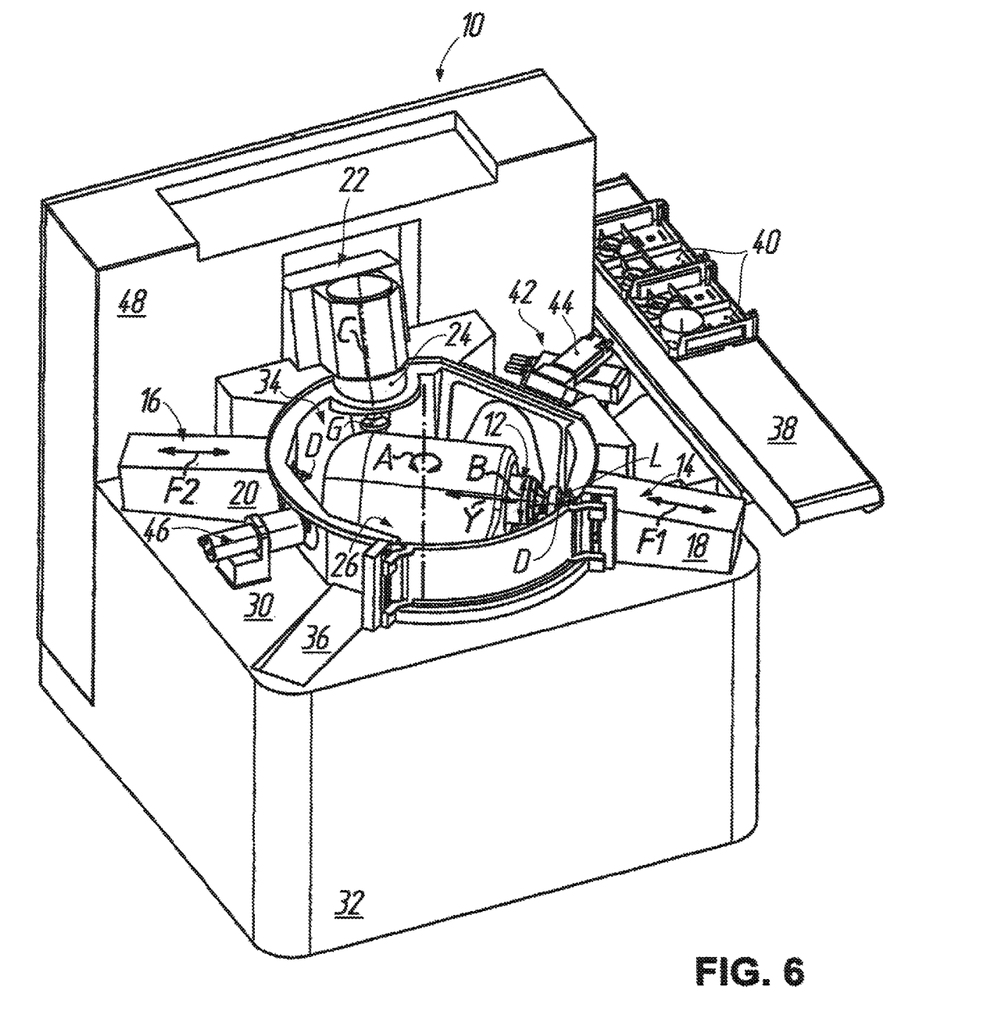
FIG. 6 shows a perspective view of a machine for processing spectacle lenses of plastic by geometrically defined cutting, obliquely from the front and above left, without a machine upper part which has been removed for a better view into the machine interior, the equipping of tooling of which includes a milling unit with a tool spindle and two turning units each with a fast-tool-servo, as an example of a machine in which also the end-face plunge cut according to FIGS. 2 to 5 can be produced.
Figure 7:
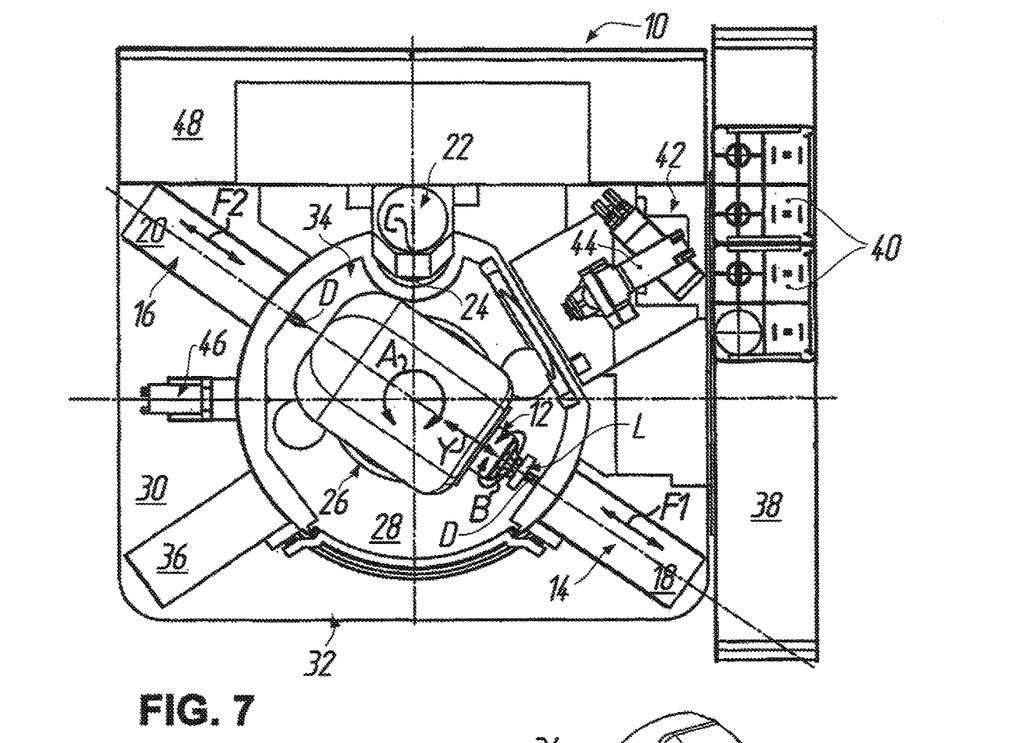
FIG. 7 shows a plan view of the machine according to FIG. 6 with a viewing direction from above in FIG. 6, wherein the machine has at the bottom left a vacant flange surface for a further processing unit (not shown here) for producing the end-face plunge cut according to FIGS. 2 to 5.

Since the processing principal steps (i), (iii) and (iv) as well as the processing sub-steps (ii.1) and (ii.3) are familiar to one ordinarily skilled in the art, the following description shall be primarily concerned with the plunge-cutting sub-step (ii.2), namely the geometry of the end-face plunge cut E, which is produced in the plunge-cutting sub-step (ii.2), in the spectacle lens L as well as method and device measures for producing this plunge cut E. In that case, two method variants are explained, namely on the one hand production of the plunge cut E in accordance with FIG. 4 in the plunge-cutting sub-step (ii.2) with use of a narrow turning chisel V mounted to be secure against rotation, details with respect to this variant being shown in FIGS. 9 to 15, and on the other hand production of the plunge cut E according to FIG. 5 in the plunge-cutting sub-step (ii.2) with use of an end mill W, that is rotationally driven; details with respect to this variant being evident from FIG. 8. In the milling process and turning process method variants use is made in the embodiments illustrated here of a machine 10 commonly referred to as a generator for surface processing of spectacle lens L, which machine is shown in FIGS. 6 and 7. This machine 10 is the generator available from Satisloh A G, Baar, Switzerland, with the trade designation "VFT orbit", which is the subject of the document EP 2 011 603 A1, which is expressly incorporated herein by reference with respect to construction and function of the machine 10.

In brief, the machine according to FIGS. 6 and 7 has a workpiece spindle 12, by which the spectacle lens L blocked on the blocking member S can be rotationally driven about a workpiece axis B of rotation. In addition, the machine 10 has in the illustrated embodiment three processing units, for material-removing processing of the spectacle lens L mounted on the workpiece spindle 12 by way of a blocking member S, namely two turning units 14, 16 each with a respective fast-tool-servo 18, 20, which serves the purpose of generating a linear movement in the direction F1 or F2 for a respectively associated turning chisel D as turning tool, as well as a milling unit 22 with a tool spindle 24 for generating a rotational movement about a tool axis C of rotation for a milling tool G. In addition, the machine 10 includes an adjusting mechanism 26, for producing a relative movement between the workpiece spindle 12 and the respective tool D, G, so as to enable selectable loading/unloading or material-removing processing of the spectacle lens L. The adjusting mechanism 26 has a linear drive unit as well as a pivot drive unit (not shown in FIGS. 6 and 7), which are arranged one on the other, wherein the workpiece spindle 12 is pivotable by the pivot drive unit about a pivot axis A substantially perpendicular to the workpiece axis B of rotation, whereas the workpiece spindle 12 is movable by the linear drive unit along a linear axis Y extending substantially perpendicularly to the pivot axis A and substantially parallel to the workpiece axis B of rotation.

The adjusting mechanism 26 is arranged in the center of an annular trough-like recess 28, which is formed centrally at an upper side 30 of a machine frame 32 monolithically constructed from polymer-concrete and which bounds a work area 34 of the machine 10. As shown in FIG. 7, the machine frame 32 has several flange surfaces 36 formed around the recess 28, in a star-like arrangement going out from the upper side 30 The flange surfaces 36 serve for mounting the processing units 14, 16, 22 and further units or stations, as still to be described in the following.

Finally, FIGS. 6 and 7 also show: (a) a transport device 38, which is mounted laterally at the machine frame 32, for the transport of work boxes 40, in which the processed spectacle lenses L or spectacle lenses L to be processed are transported, (b) a loading/unloading station 42 for loading/unloading spectacle lenses L into or from the machine 10, with a loading mechanism 44 which with respect to its degrees of freedom of movement and gripping possibilities is adapted to remove a spectacle lens L from a work box 40 and move it into the work area 34 of the machine 10 in order to clamp the blocked spectacle lens L to the workpiece spindle 12 and conversely, (c) a measuring station (46) for measuring the spectacle lenses L, and (d) a control cabinet 48 which is mounted on the machine frame 32 and which contains the necessary control and power-supply subassemblies.

As far as the kinematics of the afore-described machine 10 are concerned, it is to be emphasized in that respect that the workpiece spindle 12 is movable under CNC positional control (A axis, Y axis) in a plane extending perpendicularly with respect to the pivot axis A by the adjusting mechanism 26 including a linear drive unit and a pivot drive unit, while the spectacle lens L is rotatable in rotational angle under CNC positional control about the workpiece axis B of rotation. The spectacle lens L can thus be moved about the A axis from one processing unit or station to the next processing unit or station, with respect to a processing unit or station transversely thereto and/or along the Y axis in a direction towards or away from a processing unit or station, particularly for adjusting movements.

On the tool side when the milling tool G is used, it can be rotationally driven by the workpiece spindle 24 about the tool axis C of rotation under rotational speed regulation. When the respective turning chisel D is used, it can be reciprocatingly adjusted along a respective linear axis F1, F2, under CNC positional control and in accordance with the surface shape to be generated at the spectacle lens L, by the associated fast-tool-servo 18, 20 so as to remove chips.

Figure 8:
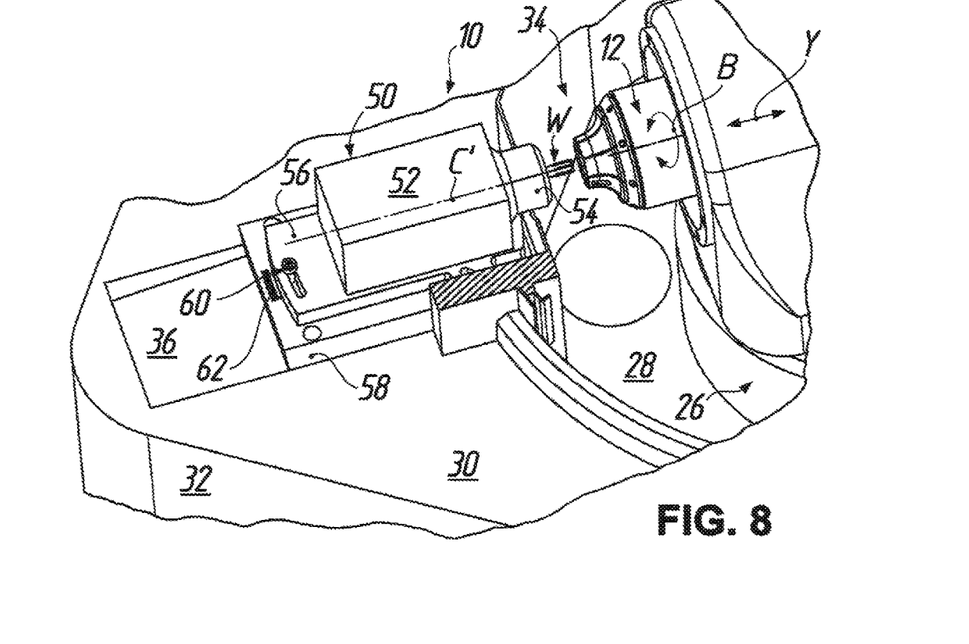
FIG. 8 shows a broken-away and partly sectioned perspective view of the machine according to FIG. 6 in the region of the flange surface of FIG. 7, on which a further milling unit with a tool spindle for driving an end mill is mounted for producing the end-face plunge cut according to FIG. 5.
Figure 9:
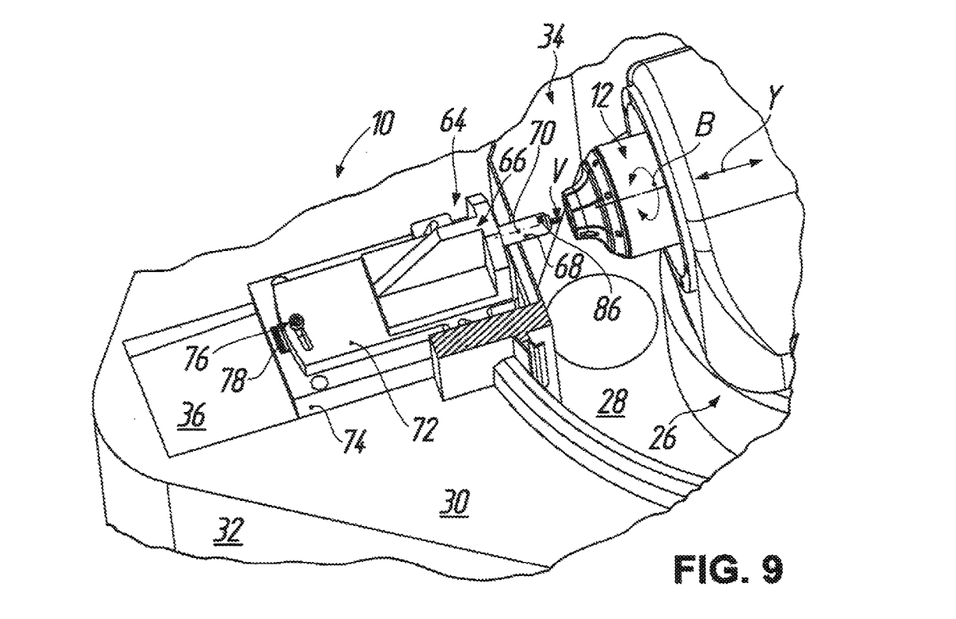
FIG. 9 shows a broken-away and partly sectioned perspective view of the machine shown in FIG. 6 in the region of the flange surface of FIG. 7, on which a further turning unit with a stationary turning chisel mount is mounted, which unit carries a narrow turning chisel for producing the end-face plunge cut according to FIG. 4.
Figure 10:
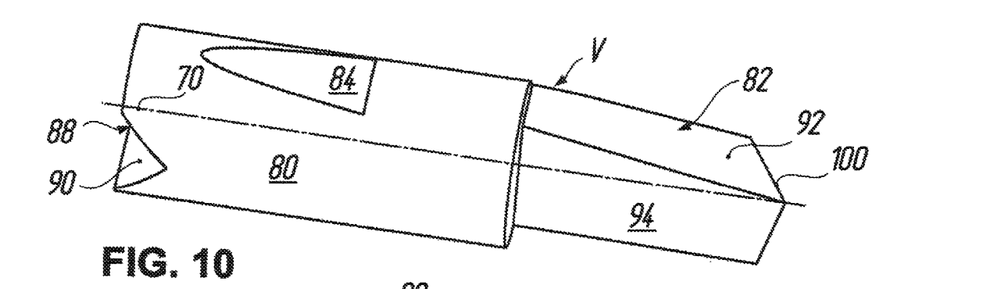
FIG. 10 shows a perspective view, to enlarged scale, of the narrow turning chisel, which is shown in FIG. 9, for producing the end-face plunge cut according to FIG. 4.
Figures 11, 12, 13:
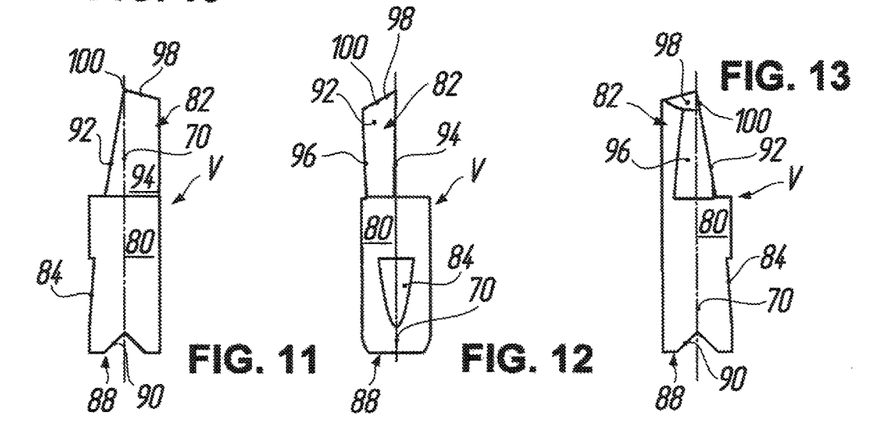
FIG. 11 shows a side view, which is reduced in scale by comparison with FIG. 10, of the narrow turning chisel of FIG. 10, with a viewing direction from the front in FIG. 10.
FIG. 12 shows a plan view of the narrow turning chisel of FIG. 10, with a viewing direction from above in FIG. 10 and to the scale of FIG. 11.
FIG. 13 shows a side view of the narrow turning chisel of FIG. 10, with a viewing direction from behind in FIG. 10 and to the scale of FIG. 11.

In FIGS. 6 and 7 the flange surface 36 of the machine frame 32 has been shown to be empty at the left bottom. As shown in FIGS. 8 and 9, a further processing unit, for example, milling unit 50 in FIG. 8 or turning a unit in FIG. 9 for producing the end-face plunge cut E in accordance with FIGS. 2 to 5 can be mounted to this flange surface 36.

Figure 5:
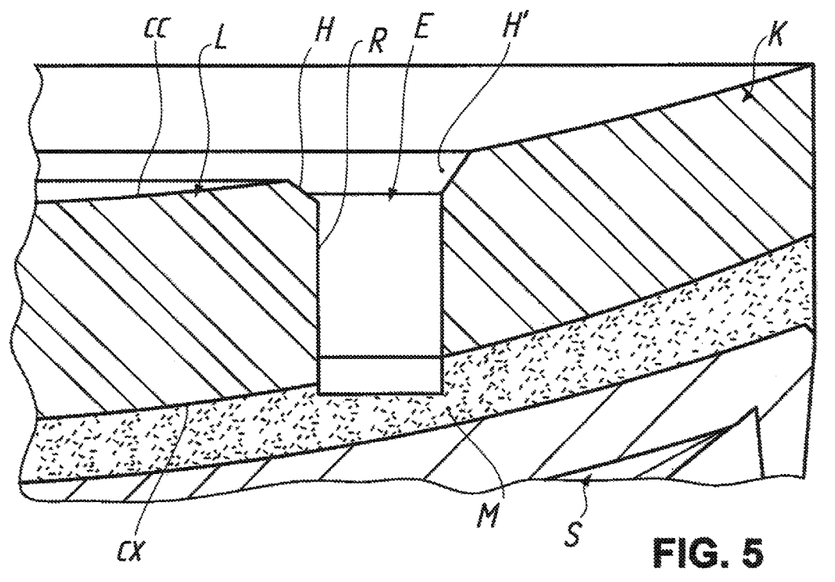
FIG. 5 shows a sectional view, which corresponds with the illustrated detail of FIG. 4 and which is broken-away and to increased scale, of the assembly of blocking member, blocking material and spectacle lens blank shown in FIG. 2, wherein the end-face plunge cut extending into the blocking material was produced by an end mill in a milling process.

According to FIG. 8, the milling unit 50 is provided as an additional processing unit for producing the end-face plunge cut E in the spectacle lens L, which is shown in FIG. 5. The milling unit 50 has a milling spindle 52 with a tool mount 54 for conventionally mounting the end mill W, preferably characterized as long and thin and which is mounted in a conventional fashion and provided along its circumference with a plurality of cutters. The end mill W fastened in the tool mount 54 can be rotationally driven about a tool axis C' of rotation, under rotational speed regulation, by the milling spindle 52. The milling spindle 52 can be arranged at a height with respect to the machine frame 32 so that the tool axis C' of rotation of the end mill W is disposed in a pivot plane, which is defined by the rotational axes A and B, of the tool spindle 12, i.e. the pivot plane formed as pivot axis B rotates about axis A.

The milling spindle 52 is in addition flange-mounted by way of a flange 56 on a bracket 58, which in turn is seated on the flange surface 36 of the machine frame 32 and attached thereto in suitable manner. Inserted between the flange 56 and the bracket 58 near the tool mount 54 is a pin (not illustrated) about which the flange 56 and thus the milling spindle 52 can be pivoted together with respect to the bracket 58. As indicated in FIG. 8 by the screw connection with slot at 60 as well as the scale 62 at the bracket 58 the tool axis C' of rotation of the end mill W can thus be adjusted with respect to the pivot axis A of the workpiece spindle 12 before the flange 56 is fixed to the bracket 58. In particular, adjustment of the milling spindle 52 at the machine frame 32 is possible in such a way that the workpiece spindle 12 can be positioned by the pivot drive unit (not shown) of the adjusting mechanism 26 about the pivot axis A in a position in which the workpiece axis B of rotation of the workpiece spindle 12 extends near and parallel to the tool axis C' of rotation of the milling spindle 52. As an alternative to a pivot connection between flange 56 and bracket 58, the connection could, however, also be designed so that the flange 56 can be displaced parallel with respect to the bracket 58 transversely to the tool axis C' of rotation for adjustment purposes. It will be evident to one ordinarily skilled in the art that the milling spindle 52 can be so preset by these measures that for a specific diameter range of the small spectacle lenses L to be processed the end-face plunge cut E can be generated in such a way (cf. FIG. 5) that the resulting edge profile R of the spectacle lens L extends substantially parallel to the axis B of rotation of the spectacle lens L.

In this embodiment of the machine 10, the plunge-cutting sub-step (ii.2) takes place substantially as follows: After milling the spectacle lens L, which is held at the workpiece spindle 12, by the milling tool G, which is driven by the tool spindle 24, in order to obtain the desired coarse macrogeometry at the second surface cc the spectacle lens L together with the workpiece spindle 12 is pivoted about the pivot axis A until the spectacle lens L is opposite the end mill W at the milling spindle 52 (for simplification of the illustration, in FIG. 8 the spectacle lens L held at the workpiece spindle 12 has been omitted). The pivoting of the spectacle lens L about the pivot axis A takes place in accordance with the required diameter of the spectacle lens L, i.e. a specific radial spacing exists between the workpiece axis B of rotation of the spectacle lens L and the tool axis C' of rotation of the end mill W. The end mill W is then rotationally driven by the milling spindle 52 and the spectacle lens L is moved towards the end mill W by movement of the workpiece spindle 12 by way of the linear drive unit of the adjusting mechanism 26 along the Y axis so that the mill penetrates to a predetermined depth with milling effect into the second surface cc of the spectacle lens L and, in particular, to such an extent that the end mill W pierces, i.e. interrupts the first surface cx of the spectacle lens L towards the blocking material M. The spectacle lens L is now slowly rotationally driven by the workpiece spindle 12 so that after a complete revolution of the spectacle lens L the encircling plunge cut E according to FIGS. 2, 3 and 5 results. Due to the rotation of the end mill W, the encircling plunge cut E has a rectangular cross-section at its base near the blocking member S, as shown in FIG. 5.

A transition region H, H' between the plunge cut E and the second surface cc is similarly illustrated in FIG. 5, which region prior to the principal step (iii) of processing of the spectacle lens L can be chamfered or radiused by a geometrically undefined cutting edge. Hence, sharp-edged transitions between the plunge cut E and the second surface cc are avoided, which otherwise could damage the grinding or polishing tool during the principal step (iii) of the processing by a geometrically undefined cutting edge.

In the afore-described method variant with a milling process for producing the plunge cut E this transition region H, H' between the plunge cut E and the second surface cc can advantageously be chamfered or radiused by the end mill W at the start and/or end of the plunge-cutting sub-step (ii.2). As is evident to one ordinarily skilled in the art, a suitable combined movement of the spectacle lens L in the three axes A, B and Y is necessary for this purpose either at the start of the plunge-cutting sub-step (ii.2), in particular exactly when the rotating end mill W penetrates the second surface cc of the spectacle lens L, and/or at the end of the plunge-cutting sub-step (ii.2), in particular when the rotating end mill W has been almost completely withdrawn from the just-produced plunge cut E.

Although the two sub-sections H and H' of the transition region can in principle be produced at the start or end of the plunge-cutting sub-step (ii.2) by the end mill W it is preferred with regard to short processing times if one sub-section H or H' of the transition region is processed at the start and the other sub-section H' or H at the end of the plunge-cutting sub-step (ii.2) by the end mill W. As opposed to production of both sub-sections H and H' of the transition region at the start or at the end of the plunge-cutting sub-step (ii.2) additional changes in sign in the respective movement direction of rotating spectacle lens L in the A and Y axes as well as idle travels of the end mill W, i.e. tool travels without material removal, are eliminated. In other words, here the relative movement of the end mill W with respect to the rotating spectacle lens L is such that the part of the end mill W active in terms of processing migrates as a consequence of the pivot movement of the spectacle lens L about the pivot axis A either from radially outwardly (sub-section H') with a pause to radially inwardly (sub-section H) or from radially inwardly (sub-section H) with a pause to radially outwardly (sub-section H') and due to the linear movement of the spectacle lens L along the linear axis Y in the direction of the blocking member S towards the base of the plunge cut E and then again away therefrom always with tool machining engagement without the necessity of an additional movement reversal in the respective axial movement.

It will be similarly apparent to one ordinarily skilled in the art that in the case of the method variant with a milling process for producing the plunge cut E after adjustment of the end mill W by a suitable combined movement of the spectacle lens L in at least the two axes A and B it is possible in the plunge-cutting sub-step (ii.2) to produce an edge profile R at the spectacle lens L which corresponds with the external or internal circumferential profile of a mount for the spectacle lens L, optionally apart from a small allowance. If the external profile of the mount, as is commonly the case, departs from circular form then production of a corresponding edge profile R at the spectacle lens L requires, during a revolution of the spectacle lens L about the workpiece axis B of rotation and depending on the external profile of the mount for the spectacle lens L, pivot movement of the workpiece spindle about the pivot axis A. For example, a minimum of two directional changes of motion is needed for oval geometries. In another example, a minimum of four changes of direction in movement is needed for shaping of a substantially rectangular spectacle lens L.

Figure 4:
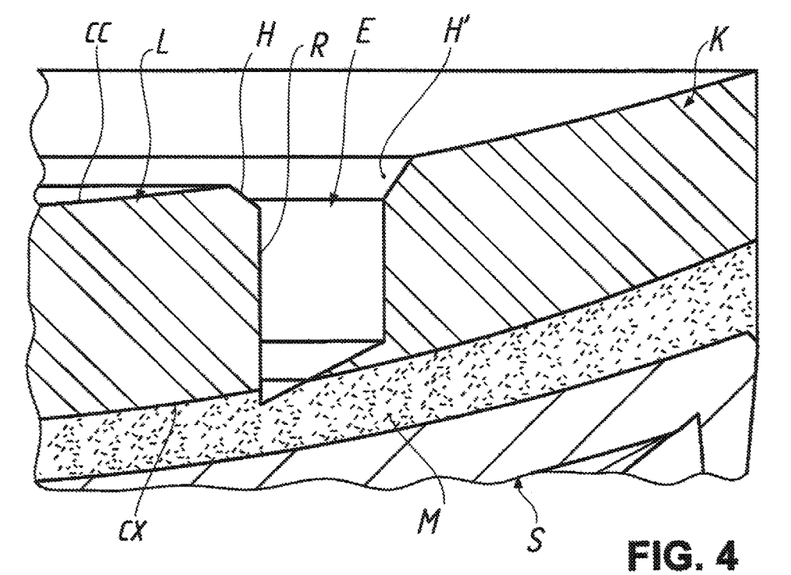
FIG. 4 shows a broken-away enlarged sectional view of the assembly shown in FIG. 2, of blocking member, blocking material and spectacle lens blank, corresponding with the detail IV in FIG. 3, wherein the end-face plunge cut extending into the blocking material was produced by a narrow turning chisel in a turning process.

For the method variant of producing the end-face plunge cut E according to FIG. 4 in the plunge-cutting sub-step (ii.2) with use of a narrow turning chisel V mounted to be secure against rotation, it is possible to provide in accordance with FIG. 9, as a further processing unit for producing the plunge cut E, a further turning unit 64 which has a tool holder 66 with a tool mount 68 for rigid attachment of the turning chisel V. The tool mount 68 is in that case arranged at such a height with respect to the machine frame 32 that a center axis 70 of the turning chisel V is disposed in the pivot plane, which is defined by the rotational axes A and B, of the workpiece spindle 12.

The tool holder 66 is, in addition, flange-mounted by way of a flange 72 on a bracket 74, which analogously to the milling variant according to FIG. 8 is in turn seated on the flange surface 36 of the machine frame 32 and fastened thereto. Again, inserted between the flange 72 and the bracket 74 near the tool mount 68 is a pin (not illustrated) about which the flange 72 and thus tool holder 66 can be pivoted together with respect to the bracket 74. A screw connection with a slot assembly 76 as well as a scale 78 are at the bracket, whereby the center axis 70 of the turning chisel V can be adjusted with respect to the pivot axis A of the workpiece spindle 12 before the flange 72 is fixed to the bracket 74.

Further details with respect to the turning chisel V can be inferred from FIGS. 10 to 13. The turning chisel V, which is made from a cylindrical base body, has a shank section 80, which is left predominantly cylindrical, for reception in a bore of the tool mount 68 and a cutting section 82. For axial fixing of the turning chisel V in the tool mount 68 the shank section 80 has a planar clamping surface 84, which is inclined or drops away with respect to the center axis 70 in the direction of the cutting section 82 and which ensures that a clamping screw screwed against the clamping surface 84 (at 86 in FIG. 9) generates, apart from a radial force component, an additional axial force component in the direction of an end 88 of the turning chisel V remote from the cutting section 82. For alignment and rotationally secure fixing in the tool mount 68 there is formed at the end 88 of the turning chisel V a V-shaped groove 90 having flanks which come into contact with a crosspin (not able to be seen in FIG. 9) extending transversely to the tool mount 68.

The cutting section 82 of the turning chisel V has planar surfaces formed at the cylindrical base body, namely a rake face 92 and three flank faces 94, 96 and 98. As can be best seen in the plan view according to FIG. 12, the flank faces 94, 96 and 98 are so arranged with respect to the rake face 92 that at the end thereof remote from the shank section 80 a cutting edge 100 extending obliquely with respect to the center axis 70 of the turning chisel V and having a foremost point lying on the center axis 70 of the turning chisel V arises. According to FIG. 12, the cutting section 82 extends only on one side of the center axis 70 away from the shank section 80 and is bounded with respect to the sides by the flank faces 94, 96, which can be best seen in FIGS. 11 and 13. Similarly, it can be inferred from these figures that the rake face 92 rises from the cutting edge 100 towards the shank section 80. It is additionally evident from the plan view according to FIG. 12 that the lateral flank faces 94, 96 taper the cutting section 82 in the direction of the shank section 80 so as to preclude jamming of the turning chisel V during plunge cutting.

The angle of the cutting edge 100 with respect to the center axis 70 of the turning chisel V is so selected in accordance with a mean curvature of the first surface cx of the spectacle lens L that the cutting edge 100, during production of the plunge cut E, by piercing, i.e. interrupting of the first surface cx of the spectacle lens L machines as little blocking material M as possible. This is advantageous particularly when a toxic and expensive alloy e.g. bismuth-based metallic alloy is used as blocking material M.

The physical position of the third flank face 98 at the end then results from the desired path of the cutting edge 100 with respect to the center axis 70 of the turning chisel V (see above and FIG. 12) and the flank angle (in FIGS. 11 and 13 between the flank face 98 and a normal to the center axis 70), which in turn depends on the rake and wedge angles, which are required for the respective material of the spectacle lens L at the cutting edge 100.

In the embodiment of the machine 10, which is illustrated in FIG. 9, with an additional turning unit 64 the plunge-cutting sub-step (ii.2) takes place substantially as described above for the milling variant with reference to FIG. 8, relating to the adjusting and advance movements in the A and Y axes of the workpiece spindle 12. In that regard, the speed of the rotational movement of the spectacle lens L about the workpiece axis B of rotation is, however, to be selected so that a relative speed, which is sufficient for appropriate formation of turning chips, of the cutting edge 100 over the spectacle lens L results. With commercially known controls in cabinet 48, the use of a turning chisel V to produce in a turning process, a plunge cut E is limited to spectacle lenses L with an edge profile R having a circular shape.

The profile, which is substantially triangular as seen in cross-section, arises at the base of the plunge cut E according to FIG. 4 as a consequence of the lead, in terms of angle, of the cutting edge 100 of the turning chisel V, with the advantage by comparison with the milling variant of FIG. 5 that significantly less blocking material M is machined during production of the plunge cut E.

The transition regions H, H', which are also illustrated in FIG. 4, between the plunge cut E and the second surface cc of the spectacle lens L are preferably chamfered or radiused by the turning tool D at the fast-tool-servo 18 or 20 in the turning sub-step (ii.3), i.e. after the plunge-cutting sub-step (ii.2), to avoid problems to the cutting geometry of the turning chisel V.

Figure 14:
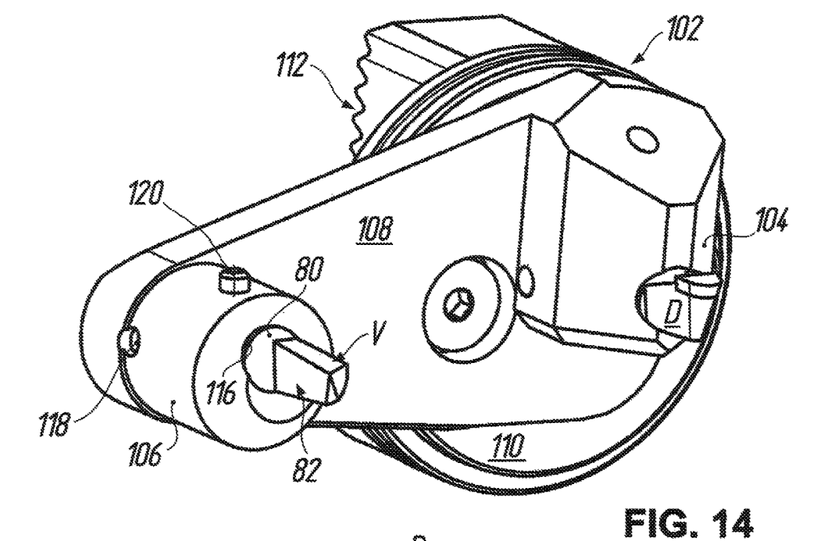
FIG. 14 shows a perspective view of a tool holder obliquely from the front and above left, which can be mounted at one of the fast-tool-servos of the machine according to FIGS. 6 and 7 and comprises two turning chisel mounts, of which the turning chisel mount on the right in FIG. 14 is equipped with a turning chisel for surface processing of the spectacle lens, whereas the narrow turning chisel illustrated in FIGS. 10 to 13 for producing the end-face plunge cut according to FIG. 4 is mounted in the turning chisel mount on the left in FIG. 14.
Figure 15:
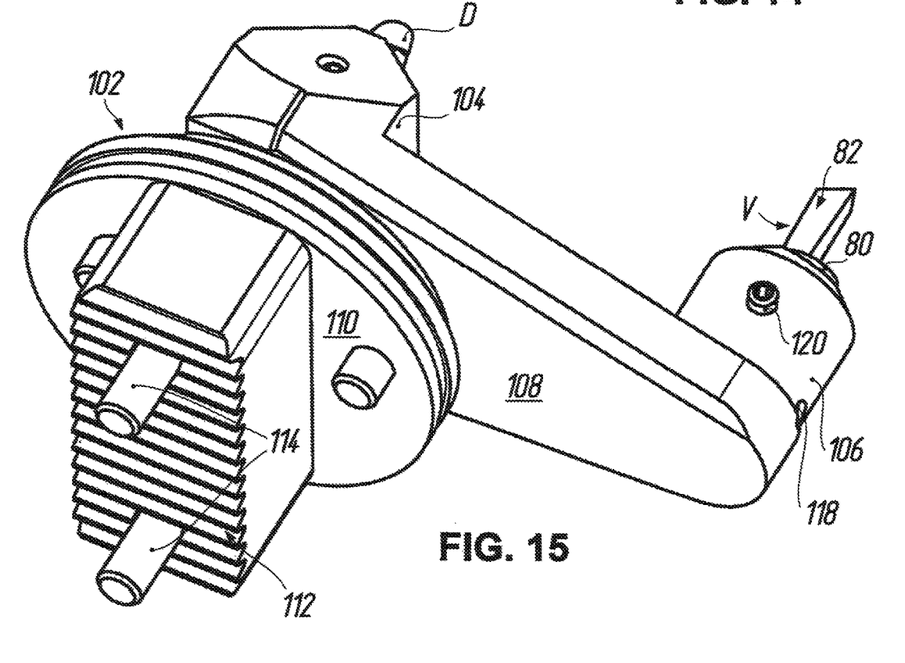
FIG. 15 shows a perspective view of the tool mount according to FIG. 14 obliquely from the back and top right.

Finally, FIGS. 14 and 15 illustrate a variant device for generating the end-face plunge cut E according to FIG. 4 by a turning process in the plunge-cutting sub-step (ii.2) of FIG. 1.

Accordingly, a tool holder 102, for fastening of the turning chisel D to the fast-tool-servo 18 or 20 of the machine 10 is provided, in accordance with FIGS. 6 and 7, laterally adjacent to the usual turning chisel mount 104 for the turning chisel D for surface processing of the spectacle lens L with a second turning chisel mount 106 for the narrow turning chisel V, which is shown in FIGS. 10 to 13, for producing the plunge cut E. For that purpose the tool mount 102 has an arm section 108 which rigidly connects the turning chisel mounts 104, 106 with one another and with a base body 110 of the tool mount 102. The base body 110 is provided in a conventionally known manner on its rear side with a toothing 112 which can mesh with a complementary profiling or toothing (not shown) at the movable part of the fast-tool-servo 18 or 20 so as to also mechanically positively fix the tool holder 102 to the moved part in addition to a connection by screws 114 indicated in FIG. 15.

The turning chisel V is received by its shank section 80 in a bore 116 of the second turning chisel mount 106 so that the cutting section 82 of the turning chisel V protrudes from the turning chisel mount 106. The turning chisel V is secured by a crosspin at 118, against which the V-shaped groove 90 (cf. FIGS. 10, 11 and 13) bears by its flanks, against twisting in the turning chisel mount 106 A clamping screw 120, which is screwed into a threaded bore of the turning chisel mount 106, engages the clamping surface 84 of the turning chisel V (see again FIGS. 10 to 13) so as to axially fix the turning chisel V in the turning chisel mount 106.

With such an embodiment of the tool holder 102, it is possible to dispense with the additional turning unit 64, which is shown in FIG. 9, at the machine 10. It will be apparent to the person ordinarily skilled in the art that it is thus possible to produce the end-face plunge cut E according to FIG. 4 by known turning process kinematics of the machine 10 (movements in the axes A, B, Y and optionally F1 or F2).

A method of processing workpieces with a first surface and a second facing away therefrom comprises the following principal steps: (i) blocking the workpiece with the aid of a blocking material on a blocking member as processing handle, with the blocking material between the blocking member and first surface, (ii) processing the workpiece by a geometrically defined cutting edge at the second surface for achieving the desired macrogeometry, (iii) processing the workpiece by a geometrically undefined cutting edge (polishing tools) at the second surface for achieving the desired microgeometry and (iv) deblocking the workpiece from the blocking member. The principal step (ii) in that case comprises a plunge-cutting sub-step (ii.2) in which by a geometrically defined cutting edge starting from the second surface an encircling plunge cut is produced which extends through the first surface into the blocking material, so that the workpiece with a predetermined edge profile remains on the blocking member radially within the plunge cut. Radially outside the plunge cut a residual ring arises, which in the principal step (iii) ensures, in particular, good edge support of the polishing tools.

Variations and modifications are possible without departing from the scope and spirit of the present invention as defined by the appended claims.

I claim:

1. A method of processing a workpiece that is a spectacle lens of plastic, having a first surface and a second surface which faces away therefrom and is to be processed, comprising the following principal steps carried out in the indicated sequence:
   (i) blocking the workpiece with the aid of a blocking material on a blocking member as holder during the processing so that the blocking material is located between the blocking member and the first surface of the workpiece,
   (ii) processing the workpiece by a geometrically defined cutting edge for achieving the desired macrogeometry at the second surface of the workpiece,
   (iii) processing the workpiece by a geometrically undefined cutting edge for achieving the desired microgeometry at the second surface of the workpiece and
   (iv) deblocking the workpiece from the blocking member, characterized in that the step (ii) of processing of the workpiece by a geometrically defined cutting edge comprises a plunge-cutting sub-step (ii.2) in which by a geometrically defined cutting edge starting from the second surface an encircling plunge cut is produced which extends through the first surface into the blocking material so that the workpiece with a predetermined edge profile remains on the blocking member radially within the plunge cut.

2. A method according to claim 1, in which the principal step (ii) of processing of the workpiece by a geometrically defined cutting edge comprises the following further sub-steps:
   (ii.1) milling of the workpiece at the second surface by a milling tool for achieving the desired coarse macrogeometry and
   (ii.3) turning the workpiece at the second surface by a turning tool for achieving the desired fine macrogeometry,
characterized in that the plunge-cutting sub-step (ii.2) is carried out between the milling sub-step (ii.1) and the turning sub-step (ii.3).

3. A method according to claim 2, characterized in that a narrow turning chisel mounted to be secure against rotation is used for producing the plunge cut in the plunge-cutting sub-step (ii.2).

4. A method according to claim 2, characterized in that a rotationally driven end mill is used for producing the plunge cut in the plunge-cutting sub-step (ii.2).

5. A method according to claim 4, characterized in that prior to the principal step (iii) of processing of the workpiece by a geometrically undefined cutting edge a transition region between the plunge cut and the second surface is chamfered or radiused.

6. A method according to claim 5, characterized in that the transition region between the plunge cut and the second surface is chamfered or radiused by the turning tool in the turning sub-step (ii.3).

7. A method according to claim 5, characterized in that the transition region between the plunge cut and the second surface is chamfered or radiused by the end mill at the start and/or end of the plunge-cutting sub-step (ii.2).

8. A method according to claim 7, characterized in that in the plunge-cutting sub-step (ii.2) an edge profile is produced at the workpiece which corresponds with the external profile of a mount for the workpiece.

9. A method according to claim 1, characterized in that a narrow turning chisel mounted to be secure against rotation is used for producing the plunge cut in the plunge-cutting sub-step (ii.2).

10. A method according to claim 1, characterized in that a rotationally driven end mill is used for producing the plunge cut in the plunge-cutting sub-step (ii.2).

11. A method according to claim 10, characterized in that prior to the principal step (iii) of processing of the workpiece by a geometrically undefined cutting edge a transition region between the plunge cut and the second surface is chamfered or radiused.

12. A method according to claim 11, characterized in that the transition region between the plunge cut and the second surface is chamfered or radiused by the end mill at the start and/or end of the plunge-cutting sub-step (ii.2).

13. A method according to claim 12, characterized in that in the plunge-cutting sub-step (ii.2) an edge profile is produced at the workpiece which corresponds with the external profile of a mount for the workpiece.

14. A method according to claim 3, characterized in that prior to the principal step (iii) of processing of the workpiece by a geometrically undefined cutting edge a transition region between the plunge cut and the second surface is chamfered or radiused.

15. A method according to claim 14, characterized in that in the plunge-cutting sub-step (ii.2) an edge profile is produced at the workpiece which corresponds with the external profile of a mount for the workpiece.

16. A method according to claim 2, characterized in that prior to the principal step (iii) of processing of the workpiece by a geometrically undefined cutting edge a transition region between the plunge cut and the second surface is chamfered or radiused.

17. A method according to claim 16, characterized in that in the plunge-cutting sub-step (ii.2) an edge profile is produced at the workpiece which corresponds with the external profile of a mount for the workpiece.

18. A method according to claim 1, characterized in that prior to the principal step (iii) of processing of the workpiece by a geometrically undefined cutting edge a transition region between the plunge cut and the second surface is chamfered or radiused.

19. A method according to claim 18, characterized in that in the plunge-cutting sub-step (ii.2) an edge profile is produced at the workpiece which corresponds with the external profile of a mount for the workpiece.

20. A method according to claim 4, characterized in that in the plunge-cutting sub-step (ii.2) an edge profile is produced at the workpiece which corresponds with the external profile of a mount for the workpiece.

* * * * *